US006177933B1

(12) United States Patent
Young

(10) Patent No.: US 6,177,933 B1
(45) Date of Patent: *Jan. 23, 2001

(54) PROVIDING VISUAL CONTINUITY WHEN DISPLAYING RELATED INFORMATION

(75) Inventor: Jeffrey E. Young, San Jose, CA (US)

(73) Assignee: Adobe Systems, Inc., San Jose, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/977,837

(22) Filed: Nov. 26, 1997

(51) Int. Cl.[7] ........................................ G06F 3/00
(52) U.S. Cl. ...................... 345/333; 345/340; 345/350
(58) Field of Search ............................. 345/333, 335, 345/340, 345, 347, 356

(56) References Cited

U.S. PATENT DOCUMENTS

| 5,140,678 | * | 8/1992 | Torres | 345/345 X |
| 5,305,435 | * | 4/1994 | Bronson | 345/356 X |
| 5,345,550 | * | 9/1994 | Bloomfield | 345/347 X |
| 5,371,675 | * | 12/1994 | Greif et al. | 345/340 X |
| 5,542,040 | * | 7/1996 | Chang et al. | 345/340 X |
| 5,664,127 | * | 9/1997 | Anderson et al. | |

OTHER PUBLICATIONS

L. E. Moseley et al., Mastering Microsoft Office 97, Sybex, p. 100, 300–303, 324–326, 366–369; 101–106, 233–235, 299, Sep. 11, 1997.*

* cited by examiner

Primary Examiner—Raymond J. Bayerl
Assistant Examiner—Cao H. Nguyen
(74) Attorney, Agent, or Firm—Fish & Richardson P.C.

(57) ABSTRACT

A method and apparatus for retaining visual continuity uses techniques that display sets of data on a computer monitor. The sets of data, stored in one or more electronic files, are arranged on separate pages so that corresponding data are positioned at the same location on each page. Corresponding page layouts enable a user to maintain focus on a particular area, for example, an area where a property name and value appear, or an area where a particular template definition and generated text appear. The invention uses visual techniques such as highlighting data to distinguish differences in the data sets. Each page has a tab so that a user can choose the page to display on the computer monitor.

23 Claims, 9 Drawing Sheets

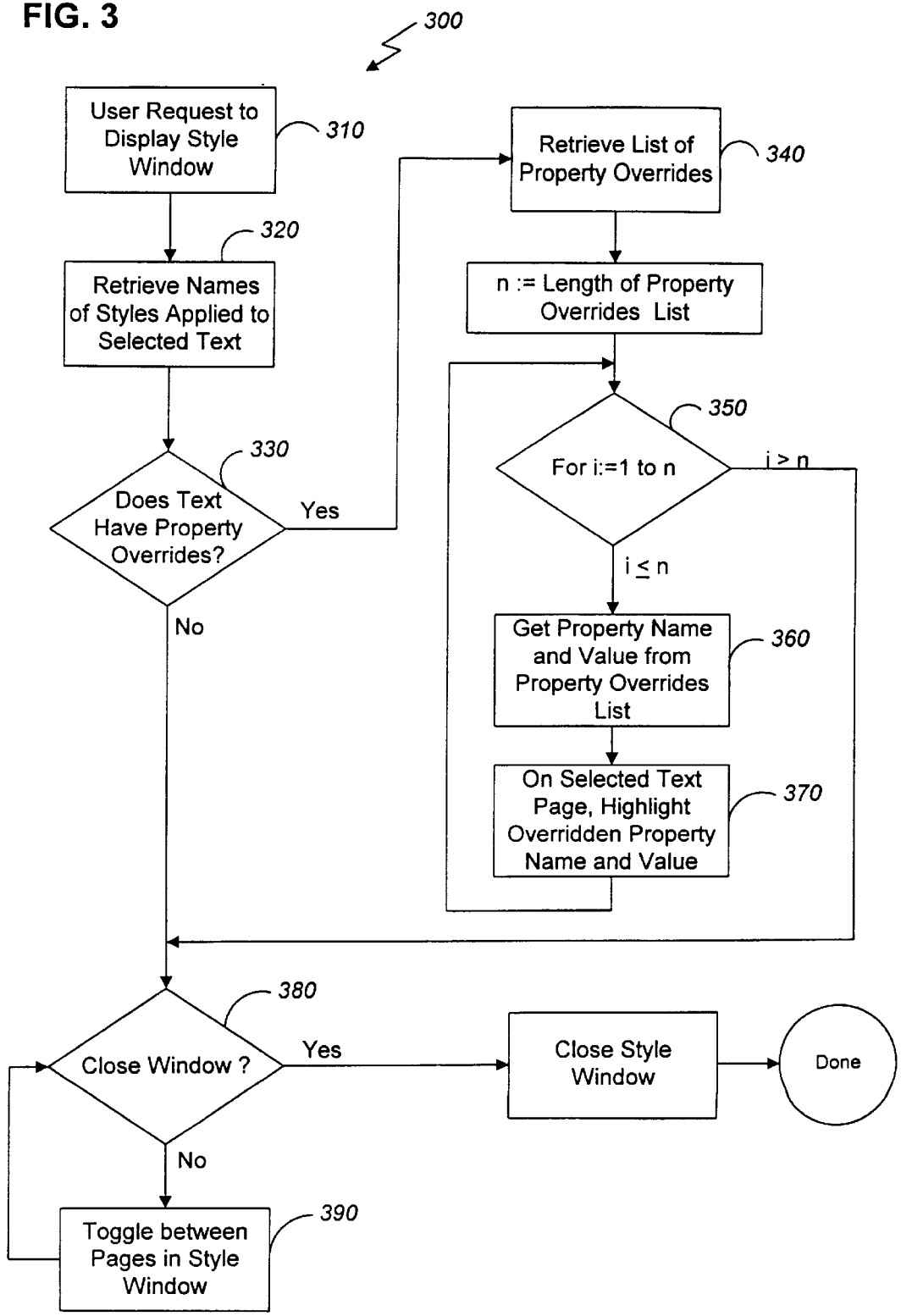

FIG. 4A

| Selected Text: Styles | |
|---|---|
| ATTRIBUTE | VALUE |
| Paragraph | Section |
| Paragraph | Body |
| Paragraph | List |
| Character | Default |

FIG. 4B

| Selected Text: Property Overrides | |
|---|---|
| ATTRIBUTE | VALUE |
| Font | Times |
| Weight | Bold |
| Justification | Left |

PROVIDING VISUAL CONTINUITY WHEN DISPLAYING RELATED INFORMATION

BACKGROUND OF THE INVENTION

The present invention relates to techniques that retain visual continuity when displaying related information.

An electronic document typically resides on a digital computer storage medium. The document may have information content, such as text, graphics, and tables, and formatting content that directs how the information content is perceived by a user. In general, the formatting content defines characteristics of lexical elements included in the information content.

Similar lexical elements share properties to maintain a consistent style throughout the electronic document. For example, first-level headings may be underlined and center justified, emphasized characters may be bold faced, and tables may be numbered automatically in a specified location.

Some document publishing systems, which include desktop publishing systems and word processing systems, allow users to define a style having a set of global properties and apply the style to a lexical element. Additionally, a document publishing system may allow a user to locally change a global property value for a particular element. These local changes to global properties will be called property overrides.

The FrameMaker® document publishing system, available from Adobe Systems in San Jose, Calif., (assignee of this patent application), displays local property values for selected text in a window on a computer display. Local property values result from global property values and property overrides. It is not always apparent to the user which displayed local property values are global property values and which are property overrides.

On some systems, to determine which, if any, local properties are property overrides, a user can locate global properties for comparison. Some systems may display the global properties used for comparison in a separate style window from the local property values. The local property window and the global property window may appear anywhere on the display, depending on where they were last placed by a user or where the document publishing system places them. For example, the windows may appear on opposite sides of the display from one another.

If a system cannot display a local property window and a global property window simultaneously, there may be a considerable delay in viewing the local property window and the global property window. The time taken by the user and the system to locate and display the properties impedes the possibility of displaying the local and global properties in rapid succession.

Another situation where a user compares two sets of data is when examining the textual content generated from template definitions. Rather than explicit words or symbols, templates use text and building blocks to specify formatting and information content. The formatting and information content is generated at run-time or when the system is requested to do so. Templates are useful for designing page layouts for tables of contents and indices, and for defining a consistent appearance for the content of headers and footers.

If the textual content generated is incorrect or undesirable, the user examines the template separately from the generated text to determine how to change the result. The presentation of the template may differ from the presentation of the generated text.

SUMMARY OF THE INVENTION

One aspect of the invention is directed to a computer-implemented method for retaining visual continuity between data sets displayed on a computer monitor. The method of the invention retrieves a first set of data, stored in an electronic file, and a second set of data to compare to the first set of data. The method arranges the first set of data on a first page and the second set of data on a second page at locations corresponding to data on the first page, and assigns a display location to the first page and a display location to the second page so that as one of the pages is displayed on a computer monitor the page appears to substantially overlay the other page. One of the pages is displayed on the computer monitor.

The method of the invention retains visual continuity when switching between the pages displayed, allowing the user to readily distinguish any differences between the pages or focus on data that should be modified. The display locations of the pages may be the same locations. The need to display another window to compare relevant information and data is eliminated. The user can rapidly alternate between viewing an element's local property values and the global property definitions of the element's style. Likewise, the user can rapidly alternate between viewing generated text and the template that defined the text. The pages may have associated tabs for selecting which page to display. On a template page, the use of pseudo-text enables the user to focus on the format and the templates that define the generated text.

BRIEF DESCRIPTION OF THE DRAWINGS

The foregoing features and other aspects of the invention will become more apparent from the drawings taken together with the accompanying description, in which:

FIG. 3 is a flow chart of a method that displays global and local properties.

FIG. 4A is an illustration of a list of styles associated with selected text.

FIG. 4B is an illustration of a property overrides list for an element.

DETAILED DESCRIPTION

Figure 1:
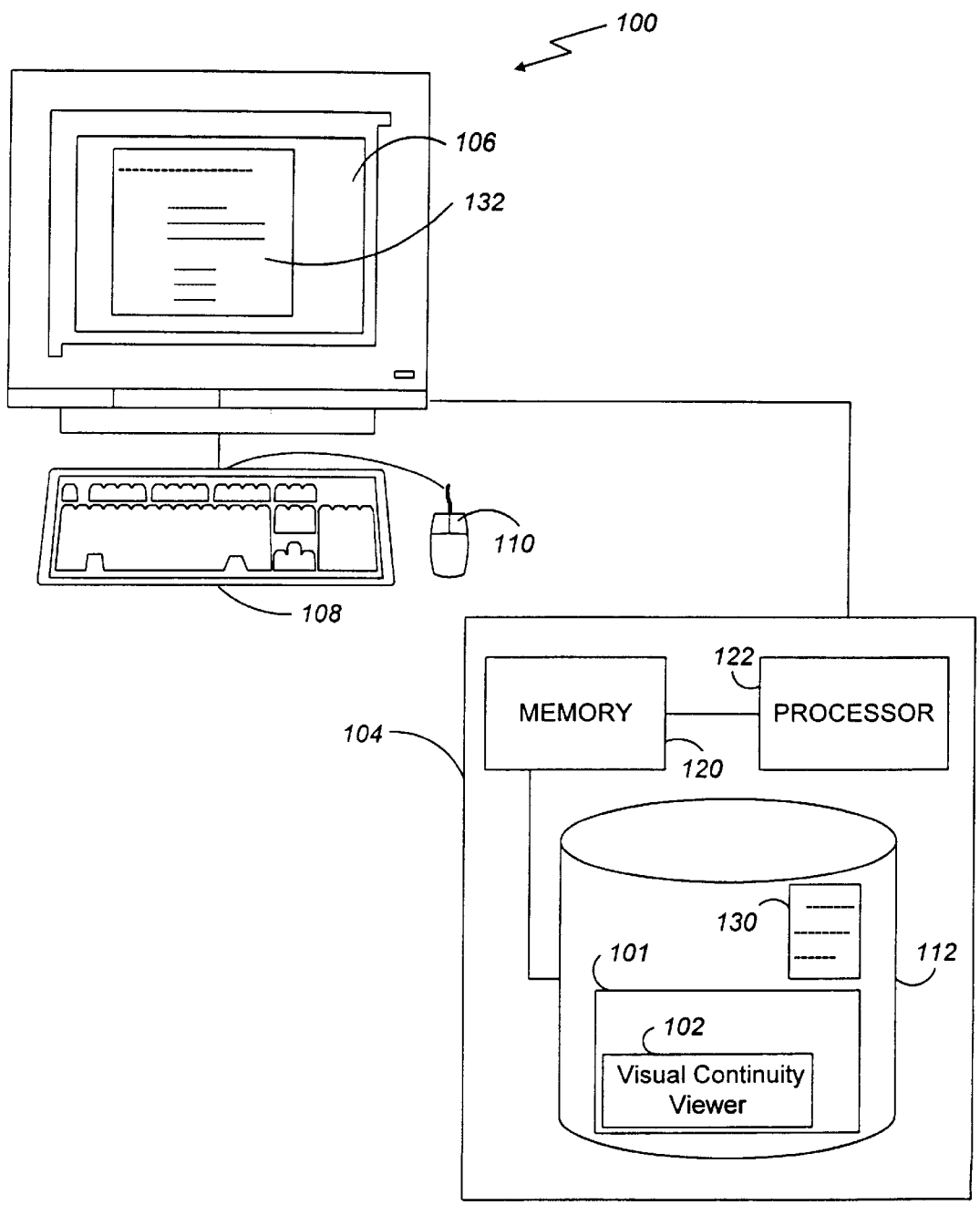
FIG. 1 is a block diagram of a computer platform suitable for supporting a visual continuity viewer.

Referring to FIG. 1, a computer platform 100, suitable for supporting a document publishing system 101 that includes a visual continuity viewer 102 is shown. The platform 100 includes a digital computer 104, a display 106, a keyboard 108, a mouse or other pointing device 110, and a mass storage device 112 (e.g., hard disk drive, magneto-optical disk drive, or floppy disk drive). The computer 104 includes memory 120, a processor 122, and other customary components (e.g., memory bus and peripheral bus, which are not shown).

An electronic document 130 contains information stored on a hard disk or other computer-readable medium, such as a diskette or CD-ROM. The electronic document is an electronic file or can be part of an electronic file. A human-perceptible version 132 of the electronic document is viewable on a computer display 106 or as a hardcopy printout generated by a computer program.

The electronic document contains a number of lexical elements, for example, groups of words that form headings or paragraphs. The electronic document also contains a variety of styles that define global property values for lexical elements, for example, a heading style that defines the font, font weight, and point size for characters in a heading. Each lexical element has one or more styles associated with it. For example, a series of characters may have a default or user-assigned character style and inherit a paragraph style by virtue of belonging to a paragraph.

While working with an electronic document, an author may modify a property value for some selected text. Later, the original or another author may need to know which, if any, local property values differ from the global property values defined by the styles applied to the element.

Figure 2A:
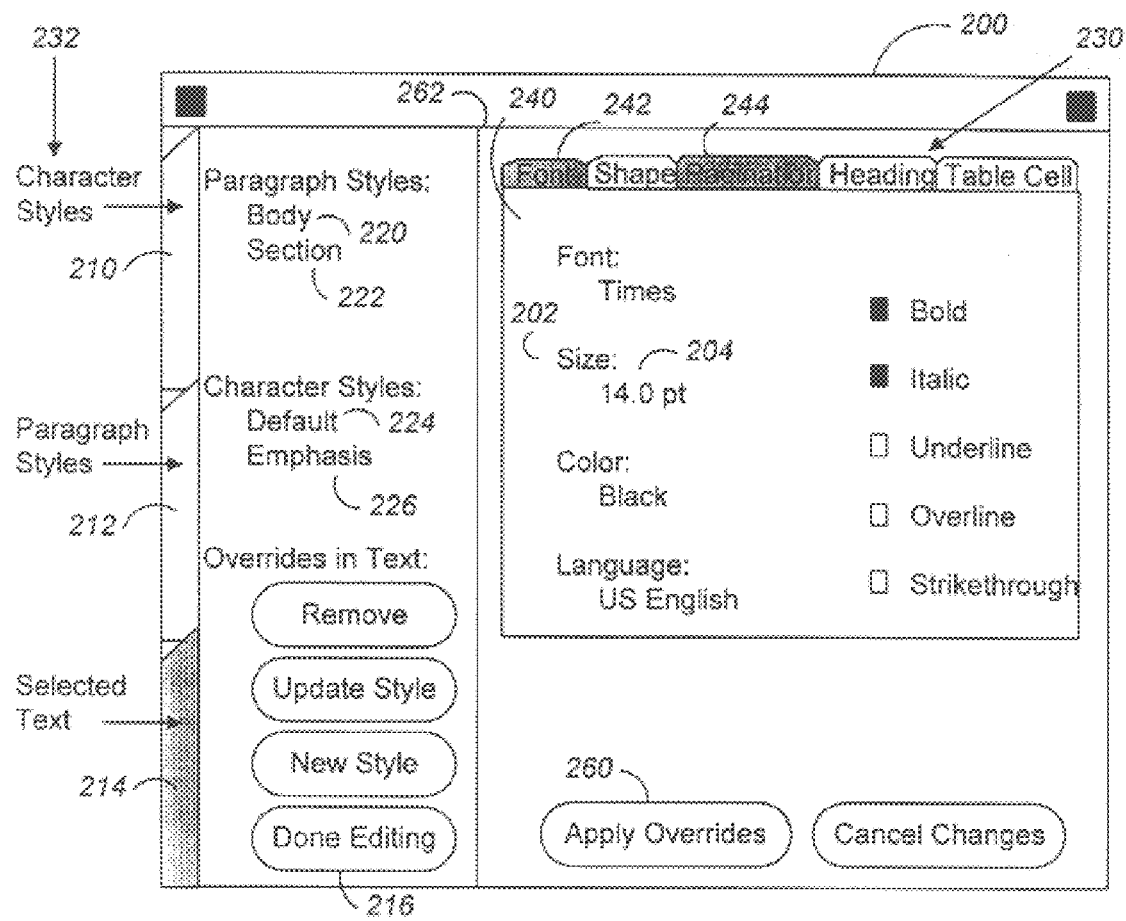
FIGS. 2A, 2B, and 2C are illustrations of a style window displaying local property values for selected text, global character styles, and global paragraph styles.
Figure 2B:
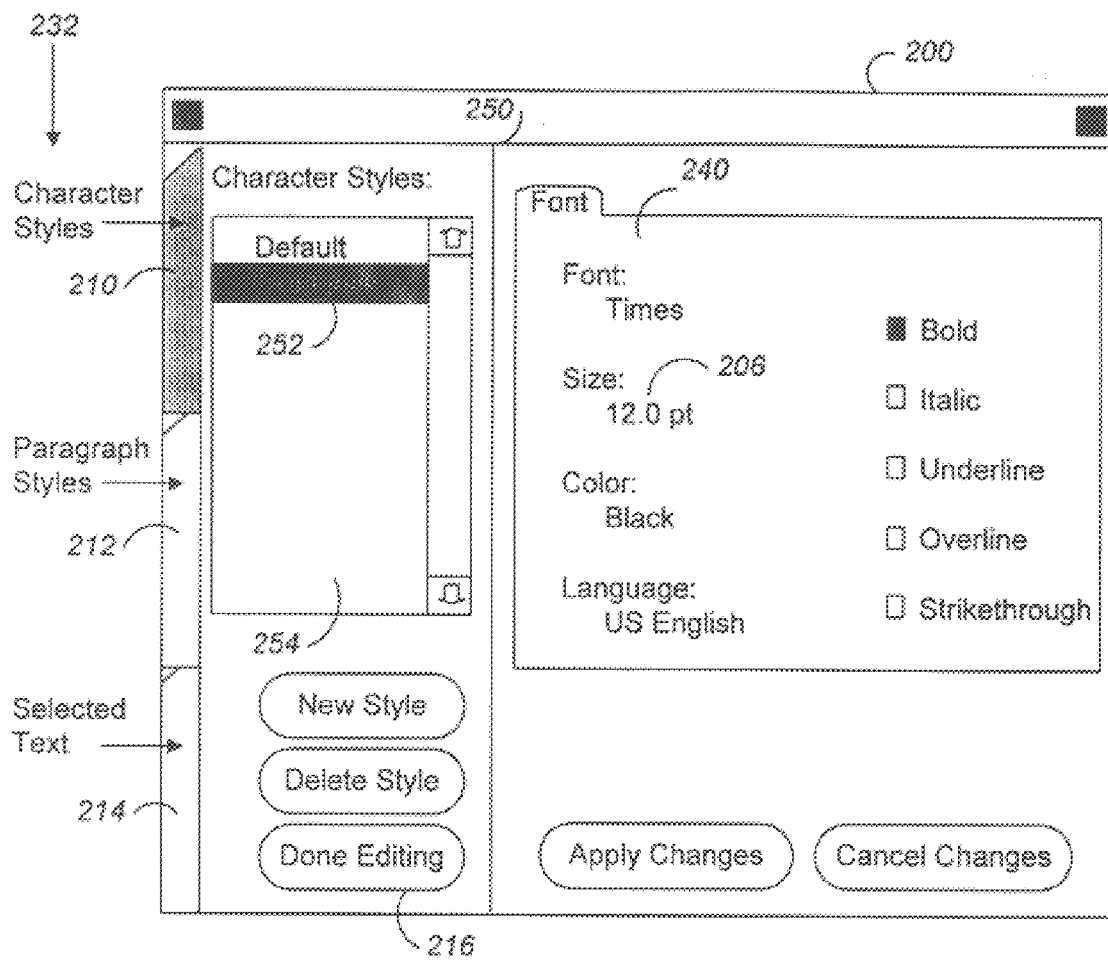
Figure 2C:
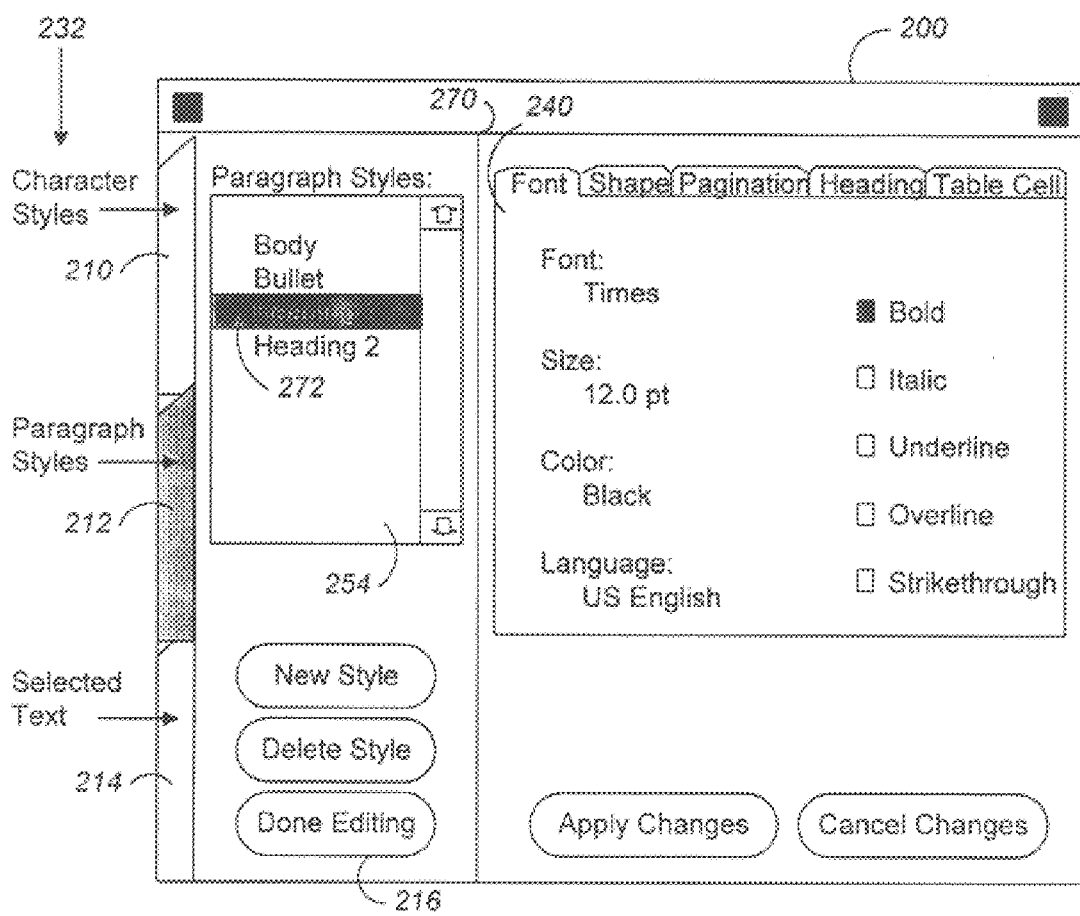

As shown in FIGS. 2A–2C, the system 101 displays property values in a style window 200. The style window 200 is organized as tabbed pages 210–214. The pages enable local properties for selected text, for example point size 204 shown in FIG. 2A, to appear in the same window as global property definitions, for example point size 206 shown in FIG. 2B. The tabs 210–214 permit the user to choose which page to display so the pages appear to substantially overlay each other in the style window 200. User choices include pages having local properties for selected text 262 (FIG. 2A), global properties defined by character styles 250 (FIG. 2B), and global properties defined by paragraph styles 270 (FIG. 2C). Each tab 210–214 has an appropriate label 232 within the tab 210–214, shown in FIGS. 2A–2C in a horizontal position.

As shown in FIG. 2A, when the user chooses the selected text tab 214, the page 262 that contains local properties for the selected text appears in front of the other pages. All styles applied to the selected text are listed in the style window 200. For example, a body paragraph style 220, a section paragraph style 222, a default character style 224, and an "Emphasis" character style 226 may all be applied to the selected text.

The system 101 examines the selected text and identifies which property values have property overrides. The names (e.g., "Size" 202), and values (e.g., 14.0 pt 204) of overridden properties are highlighted by displaying the property name 202 and value 204 using a special color, such as red. Another technique for highlighting a property override is to display a symbol, such as an asterisk, beside the property name. Other techniques to highlight property overrides may include shading, font selection, animation, and transparent overlays.

Properties may be grouped into categories. If the properties are categorized, the right-hand side of the style window has tabs 230 to select which category to display. To locate the property override in a style window in which properties are categorized, the appropriate tabs 230 on the right-hand portion of the selected text page are highlighted. For example, if a font property and a pagination property had property overrides, the "Font" tab 242 and "Pagination" tab 244 may be shaded or the tab labels displayed using the color red.

Referring to FIG. 2B, when the user selects the character styles tab 210, using a pointing device for example, a character style page 250 appears in the style window 200. In the left portion of the page, a scrolling list 254 lists all defined character styles. A style may be selected by default or by the user. The selected style 252 is highlighted in the scrolling list 254. Global properties for the selected character style are displayed in the right portion of the page. To view another set of global properties, the user can choose a style name in the scrolling list 254.

Referring to FIG. 2C, when the user selects the paragraph styles tab 212, the style window 200 contains a paragraph style page 270. In the left portion of the page, the scrolling list 254 lists all defined paragraph styles. The right portion of the page contains global properties for the highlighted paragraph style 272. By default, the system 101 displays the paragraph style associated with the selected text. The user can select another style from the scrolling list 254 to view another set of global properties.

As shown in FIGS. 2A, 2B, and 2C, more than half of the style window 200 retains the same visual appearance on all tabbed pages. The right portion of the character styles, paragraph styles, and selected text pages retain the same, or substantially the same, spatial representation for the properties the pages have in common. The system 101 uses identical or corresponding arrangements so that a user can focus on one area in the style window and easily determine whether the property values are the same, while switching pages by selecting a tab.

For example, all three pages (i.e., selected text, paragraph styles, and character styles), display values pertaining to fonts. The arrangement of the font properties and font values on each page is identical. As a user switches pages, the font portion 240 of the window remains unchanged except for values that differ and the highlighting technique applied to draw attention to property overrides. Likewise, the paragraph styles page and the selected text page have identical arrangements for paragraph properties.

Referring to FIG. 3, a style viewer method 300 begins when the user selects text and makes a request to display the style window (step 310). Names of the styles applied to the selected text are retrieved (step 320), in a manner dependent upon the structure of the document, as will be discussed. The method 300 determines whether the selected text has property overrides (step 330), for example, by testing for the presence of an override list. If the selected text contains property overrides, the method 300 retrieves the property overrides list (step 340).

Shown in FIG. 4B is an example of an overrides list. The overrides list is made and an attribute/value pair is added to the overrides list when the user first applies an override by pressing the Apply Overrides button 260 (FIG. 2A), on the selected text page 262. Each time the user applies another override by pressing the Apply Overrides button 260, an attribute/value pair is added to the properties overrides list.

Referring again to FIG. 3, for each attribute/value pair (step 350), the method 300 retrieves the property override (step 360). On the selected text page, property overrides are highlighted by displaying the property name 202 and value 204 in a special color, such as red (step 370).

The style window remains open until the user applies a window closing technique (step 380), such as clicking the cursor over an 'X' located on the window's border. While a style window remains open, the user can select the character styles, paragraph styles, and selected text pages within the open style window (step 390), using the tabs on the edge of the pages or other techniques such as a button or menu associated with the window.

The technique used to obtain the style names (step 320) depends upon the structure of the electronic document. In a linearly structured document the applicable styles may be the paragraph style and character style whose name was last embedded in the electronic document. In a document having a hierarchical structure, styles associated with the selected text may be inherited by the selected text and stored in one or more data structures.

Referring to FIG. 4A, a style list specifies which styles were applied to the selected text. The style list has attribute/value pairs. The attributes are the type of style, for example, a paragraph style or a character style. The values are the style names. The style list for the selected text may be a composite of separate style lists associated with various elements in the selected text.

Referring to FIG. 4B, the selected text has a list of property overrides associated with it. As previously mentioned, when the user chooses to override a property, an attribute/value pair is added to the property overrides list. The attributes in the property overrides list are property names and the values in the property overrides list are the overridden values for the corresponding property. The overrides list may be formed from separate lists associated with various elements in the selected text.

Figure 5:
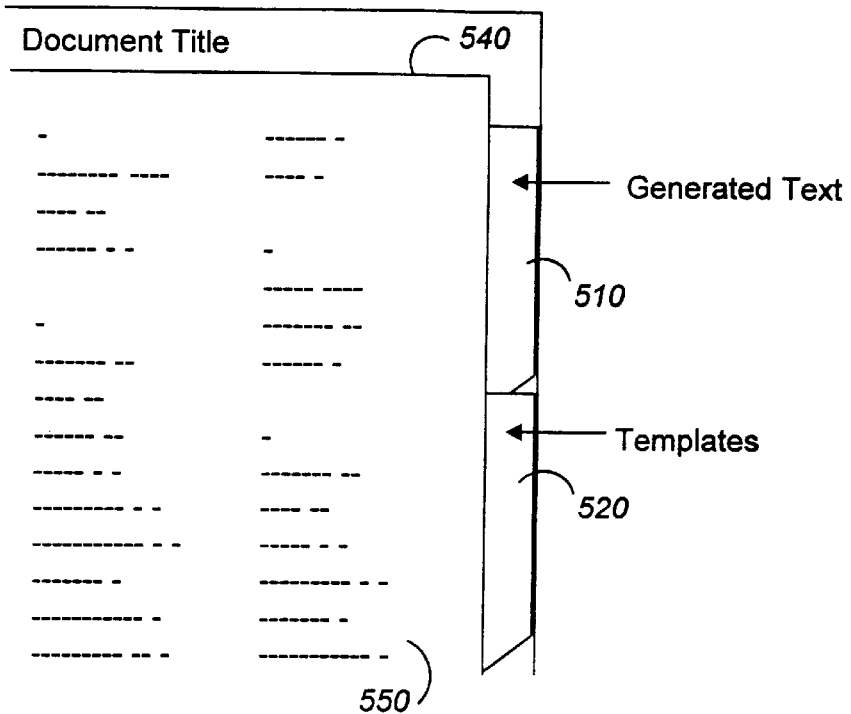
FIG. 5 shows a corner of a tabbed template page overlaid on a tabbed generated text page.

Referring to FIG. 5, in addition to examining and editing properties, the system 101 also enables the user to examine and edit a template within the same window as the text generated from the template. The template and the generated text appear on different pages in substantially the same location. The pages are arranged so that related information and data appear in corresponding locations on the different pages.

As shown in FIG. 5, an electronic document 132 as viewed on a computer display has tabs that are used to select which page appears in front of the other pages. To view the text generated from template definitions, the user chooses the generated text tab 510. To view the template definitions which defined the layout and specified the content of the generated text, the user chooses the templates tab 520. The template 550 appears on the template page 540 in substantially the same space as the generated text appears on the generated text page. If one template definition was used multiple times to generate text, multiple instances of the template definition are displayed on the template page 540. For example, to generate an index, a template defining one heading having a block of index entries may be used twenty-six times, one for each letter of the alphabet.

Figure 6A:
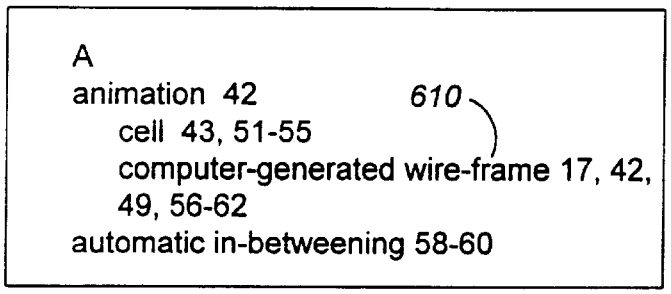
FIG. 6A is an illustration of a portion of an index.

Referring to FIG. 6A, the appearance of an index depends not only on a template definition, but also on the amount of text generated. Due to the length of the string 610 "computer-generated wire-frame" and the amount of numerals in the page numbers that follow the string, the generated page numbers flow onto the following line.

Figure 6B:
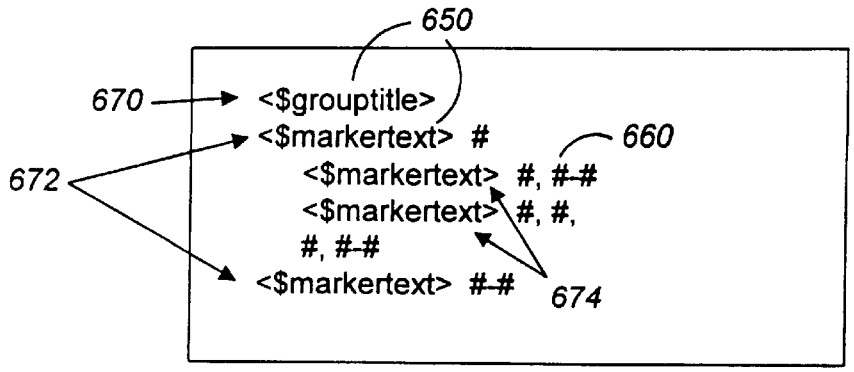
FIG. 6B is an illustration of a portion of a template used to generate the index entries in FIG. 6A.

Referring to FIG. 6B, the template for the index has the same spatial resemblance as the generated text. Building blocks 650 and page number placeholders 660 appear in the same location as the generated text. FIG. 6B shows a template definition that includes one instance of a group title 670, two instances of a level 1 entry 672, and two instances of a level 2 entry 674. However, as depicted in FIG. 5, multiple instances appear on the template page 540.

Figure 7:
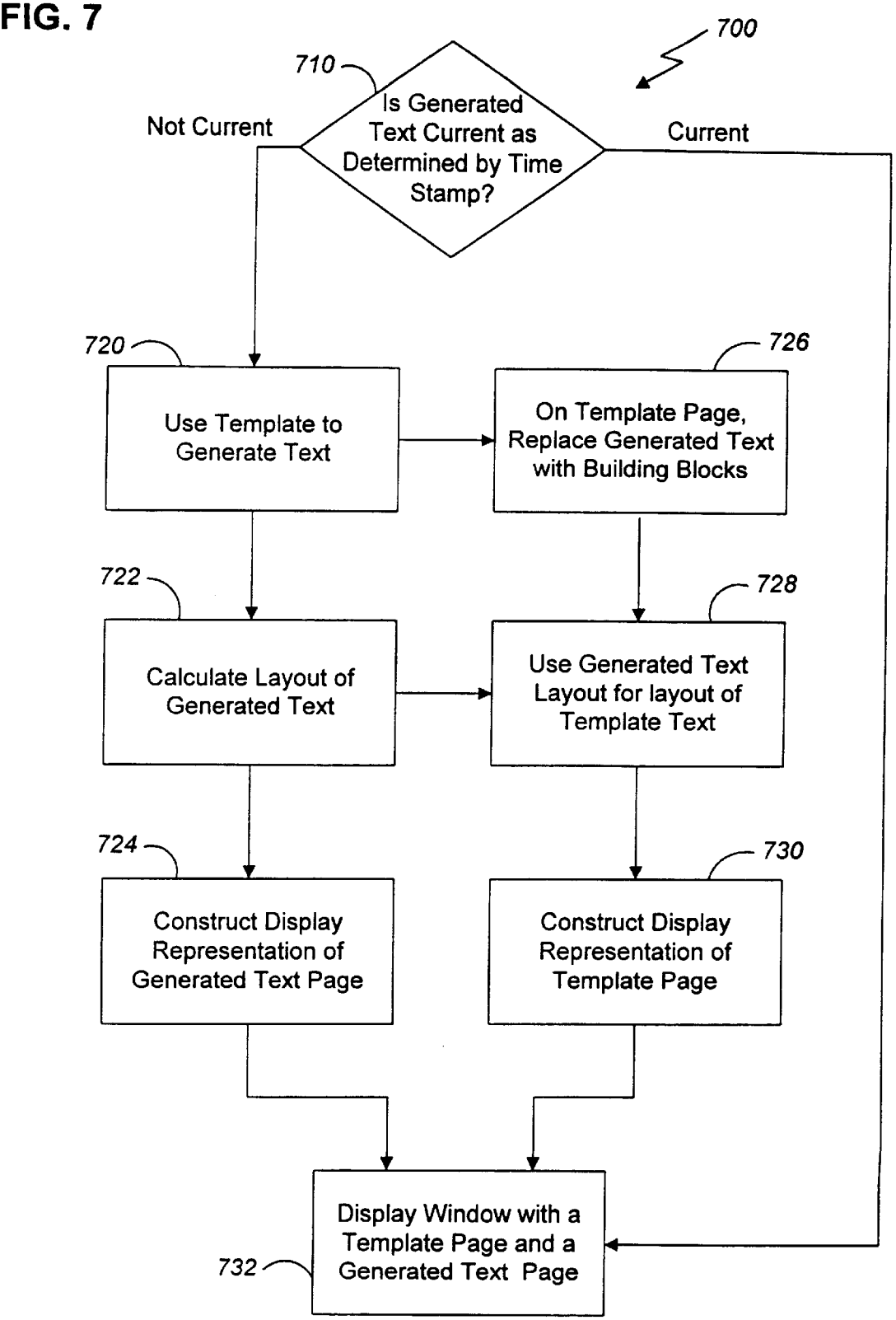
FIG. 7 is a flow chart of a method that displays a template and the contents generated using the template.

FIG. 7 shows a method 700 for displaying template and generated text pages in the same window. The appearance of the generated text determines the appearance of the template as displayed on the template page 540. Therefore, the method 700 first determines whether the generated text is current by examining a time stamp associated with the text (step 710). If the generated text is not current, the method 700 uses the template to generate the text (step 720). The layout of the generated text is calculated (step 722) and the display representation of the generated text page is constructed (step 724). The generated text page is used to generate the template page 540. The template page 540 may begin as a copy of the generated text page. Then, on the template page 540, the generated text is replaced with building blocks (step 726) and the generated text layout is used for the layout of the template text (step 728). The display representation of the generated text page is constructed (step 724). As a final step, the method 700 displays a window that contains the template page 540 and the generated text page (step 780).

Figure 8:
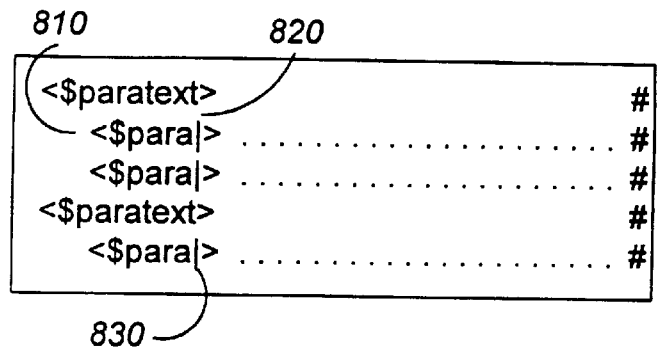
FIG. 8 shows editing a building block that is instanced a multiple number of times.

As shown in FIG. 8, the user can edit a template page 540. If a building block 810 appears more than once on the template page 540, all selected occurrences of the building block are edited simultaneously. A cursor 820 tracks the current editing position. As the user edits the building block, other occurrences of the same building block 830 reflect the modifications at the current editing position.

Generally, indices and tables of contents are generated entirely from templates. For those pages in an electronic document in which the user entered text, pseudo-text (also known as greeked text), is substituted for user-entered text. Using pseudo-text enables the user to focus on the templates that define the generated text.

Figure 9:
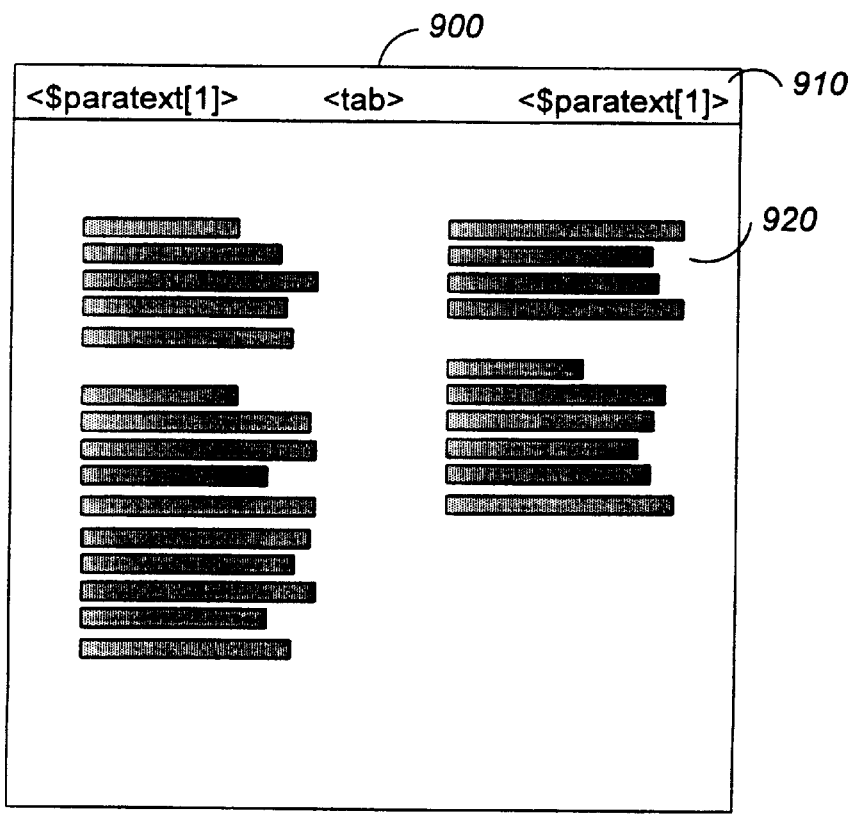
FIG. 9 is an illustration of a portion of a template page that has pseudo-text.

Referring to FIG. 9, a template page 540 may include a header 910 and paragraphs 920 formatted as columns. Attention is drawn to the building blocks that may be edited because the non-generated text is pseudo-text shown as shaded strips. Other techniques for representing text as pseudo-text include displaying dashed lines and solid lines.

Code displayed for debugging purposes can also be overlaid on tabbed pages. As an example, consider a programmer analyzing whether a programming mistake is attributable to the source code or a compiler bug. In debug mode, the debugger can display the high-level source code, for example code in the C language, on one tabbed page. On another tabbed page, the debugger can display the assembly code produced by the C compiler.

While viewing the high-level source code on one page of the debugger, the programmer can step through the C statements in the program, view the contents of variables, and analyze the behavior of the program. The programmer can select the appropriate tab to switch pages to the assembly code page to see the instructions generated by the C compiler. The instructions displayed on the assembly code page initially correspond to the C statements on the source code page of the debugger.

While viewing the assembly code page, the programmer can step through the low-level instructions generated by the compiler, view the contents of registers, and analyze the behavior of the program. If the programmer selects the tab to view the source code page, the source code on that page corresponds to the assembly code currently on the assembly code page.

Other embodiments are within the scope of the following claims. The system may display a paged window for reasons other than a user request. Alternative highlighting techniques may be implemented, for example, using bold-weight or italics for black and white computer displays. The method can display data other than properties for paragraph and character styles, and templates and generated text. For example, the method could display paged data relevant to variables, labeling and numbering formats, and table, figure, and line styles. Additionally, the data can reside in more than one electronic file.

What is claimed is:

1. A computer-implemented method for providing visual continuity when displaying related information on a computer monitor, comprising:

retrieving a first set of data stored in a first electronic file and a second set of data stored in a second electronic file, the second set of data having a generative relationship to the first set of data;

arranging the first set of data on a first page and the second set of data on a second page by tracking the first set of data and aligning the second set of data on the second page based on an arrangement of the first set of data on the first page;

assigning a first display location to the first page and a second display location to the second page so that as a first one of the first and second pages is displayed on a computer monitor the first one of the first and second pages appears to substantially overlay a second one of the first and second pages; and displaying the first one of the first and second pages on the computer monitor.

2. The method of claim 1, wherein the first set of data on the first page and corresponding data in the second set of data on the second page are at the same locations on the respective pages, and the first display location and the second display location are the same location so that the pages appear to overlay each other.

3. The method of claim 1 wherein the first electronic file is the same electronic file as the second electronic file.

4. The method of claim 1 wherein the first electronic file and the second electronic file are different electronic files.

5. The method of claim 1, wherein a first tab is associated with the first page and a second tab is associated with the second page and where selecting the first tab operates to select the first page to display on the computer monitor and where selecting the second tab operates to select the second page to display on the computer monitor.

6. The method of claim 1, wherein the first electronic file includes at least part of an electronic document, the first set of data includes a plurality of local properties associated with an element in the electronic document in accordance with a global style and overrides to the global style applied to the element, and the second set of data includes a plurality of properties defined by the global style.

7. The method of claim 6, wherein overrides to the global style comprise:

changing a local property by modifying a local property value; and using a highlighting technique to indicate the change to the local property value in the first set of data on the first page.

8. The method of claim 1, wherein the first electronic file includes at least part of an electronic document, the first set of data includes a plurality of lexical elements generated using a template definition, and the second set of data includes a representation of the template definition that generated the first set of data.

9. The method of claim 8, further comprising:

generating an appearance for a representation of the template definition on the second page in accordance with an appearance of the lexical elements on the first page.

10. The method of claim 9, wherein to generate the appearance for the representation of the template definition, a layout of the first page is used for the second page and a set of template building blocks replace the generated lexical elements.

11. The method of claim 10, further comprising:

editing the representation of the template definition on the second page; and updating multiple occurrences of a template building block and text during the editing operation.

12. The method of claim 1, wherein the first set of data includes a plurality of statements written in a computer programming language, and the second set of data includes a plurality of computer code generated by a compiler for the first set of data.

13. A computer-implemented method for providing visual continuity when displaying related information on a computer monitor, comprising:

defining, in an electronic document, a global style having a plurality of properties;

applying the style to an element in the electronic document, the properties of the global style becoming a plurality of local properties of the element;

arranging the local properties on a first page having a first tab and the properties of the global style on a second page having a second tab by tracking the local properties on the first page and aligning the properties of the global style on the second page based on an arrangement of the local properties on the first page;

assigning a first display location to the first page and a second display location to the second page so that as a first one of the first and second pages is displayed on a computer monitor the first one appears to overlay a second one of the first and second pages;

selecting the first tab to display the first page and the second tab to display the second page;

displaying one of the first and second pages in accordance with the selected tab on the computer monitor;

changing a local property by modifying a local property value; and highlighting the change to the local property value.

14. A computer-implemented method for providing visual continuity when displaying related information on a computer monitor, comprising:

defining, in an electronic document, a template used to generate a plurality of lexical elements;

generating the lexical elements from the template definition;

calculating an appearance for a representation of the template definition in accordance with an appearance of the lexical elements and by replacing the generated lexical elements with a set of template building blocks;

arranging the lexical elements on a first page having a first tab and a representation of the template on a second page having a second tab by tracking the lexical elements and aligning the representation of the template base on an arrangement of lexical elements on the first page;

assigning a first display location to the first page and a second display location to the second page so that as a first one of the first and second pages is displayed on a computer monitor the first one appears to overlay a second one of the first and second pages;

selecting the first tab to display the first page and the second tab to display the second page;

displaying one of the first and second pages in accordance with the selected tab on the computer monitor;

editing the representation of the template definition on the second page; and updating multiple occurrences of a template building block and text during the editing operation.

15. A computer program, residing on a computer-readable medium, comprising instructions causing a computer to:

retrieve a first set of data, stored in an electronic file, and a second set of data to compare to the first set of data;

arrange the first set of data on a first page and the second set of data on a second page by tracking the first set of data and aligning the second set of data on the second page based on an arrangement of the first set of data on the first page;

assign a first display location to the first page and a second display location to the second page so that as a first one of the first and second pages is displayed on a computer monitor the first one of the first and second pages appears to substantially overlay a second one of the first and second pages; and display the first one of the first and second pages on the computer monitor.

16. The computer program of claim 15, wherein a first tab is associated with the first page and a second tab is associated with the second page and where selecting the first tab operates to select the first page to display on the computer monitor and where selecting the second tab operates to select the second page to display on the computer monitor.

17. The computer program of claim 15, wherein the first set of data on the first page and corresponding data in the second set of data on the second page are at the same locations on the respective pages, and the first display location and the second display location are the same location so that the pages appear to overlay each other.

18. The computer program of claim 15, wherein the electronic file includes at least part of an electronic document, the first set of data includes a plurality of local properties associated with an element in the electronic document in accordance with a global style and includes overrides to the global style applied to the element, the second set of data includes a plurality of properties defined by the global style, and highlighting is used to indicate a local property in the first set of data that differs from a corresponding property defined by the global style.

19. The computer program of claim 15, wherein the electronic file includes at least part of an electronic document, the first set of data includes a plurality of lexical elements generated using a template definition, and the second set of data includes a representation of the template definition that generated the first set of data.

20. The computer program of claim 19, further comprising instructions causing a computer to:

generate an appearance for a representation of the template definition on the second page in accordance with an appearance of the lexical elements on the first page.

21. The computer program of claim 20, wherein while generating the appearance for the representation of the template definition, a set of template building blocks replace the generated lexical elements.

22. The computer program of claim 19, further comprising instructions causing a computer to:

enable a user to edit the representation of the template definition on the second page; and update multiple occurrences of a template building block and text during the editing operation.

23. The computer program of claim 15 wherein the first set of data includes a plurality of statements written in a computer programming language, and the second set of data includes a plurality of computer code generated by a compiler for the first set of data.

* * * * *